United States Patent
Manthrayil Sachidanandan et al.

(10) Patent No.: US 11,696,351 B2
(45) Date of Patent: Jul. 4, 2023

(54) DEVICES, SYSTEMS AND METHODS FOR ESTABLISHING A BIDIRECTIONAL LINK BETWEEN DEVICES

(71) Applicant: ZEBRA TECHNOLOGIES CORPORATION, Lincolnshire, IL (US)

(72) Inventors: Umesh Manthrayil Sachidanandan, Bangalore (IN); Sajan Wilfred, Kollam (IN); Eric M. Malmed, Selden, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/119,658

(22) Filed: Dec. 11, 2020

(65) Prior Publication Data

US 2022/0191956 A1 Jun. 16, 2022

(51) Int. Cl.
*H04W 4/80* (2018.01)
*H04W 76/14* (2018.01)
(Continued)

(52) U.S. Cl.
CPC .......... *H04W 76/14* (2018.02); *H04B 17/318* (2015.01); *H04W 4/80* (2018.02); *H04W 24/08* (2013.01); *H04W 24/10* (2013.01)

(58) Field of Classification Search
CPC ............ G06K 7/0008; G06K 7/10227; G06K 7/10138; G06K 7/10366; G06K 7/10465;
(Continued)

(56) References Cited

U.S. PATENT DOCUMENTS 9,913,230 B1 3/2018 Tyagi et al.
10,013,590 B2 * 7/2018 Lim ................. G06K 19/07758
(Continued)

FOREIGN PATENT DOCUMENTS

EP 3113550 A1 1/2017
WO 2006115371 A1 11/2006
(Continued)

OTHER PUBLICATIONS

Combined Search and Examination Report for Great Britain Patent Application No. GB2117835.5 dated May 13, 2022.
(Continued)

*Primary Examiner* — Frank Duong

(57) ABSTRACT

Techniques for establishing a bidirectional wireless communication link between two otherwise detachable devices when these devices are physically joined together for use as a physically joined device are provided. An example method includes receiving by a mobile computing device a short-range wireless signal from an RFID reader device; monitoring, by the mobile computing device, an RSSI associated with the signal from the RFID reader device; and establishing, by the mobile computing device, a wireless communication connection to the RFID reader device based on the measured RSSI associated with the signal from the RFID reader device being greater than a threshold RSSI value, wherein the threshold RSSI value is calibrated based on an RSSI value associated with the short-range wireless signal from the RFID reader device measured by the mobile computing device when the mobile computing device is physically joined to RFID reader device for use as a joined device.

28 Claims, 6 Drawing Sheets

(51) Int. Cl.
*H04B 17/318* (2015.01)
*H04W 24/08* (2009.01)
*H04W 24/10* (2009.01)

(58) Field of Classification Search
CPC ............ G06K 19/0723; G06Q 10/087; H04B 5/0031; H04B 17/14; H04B 17/318; H04W 4/80; H04W 24/08; H04W 24/10; H04W 76/14
See application file for complete search history.

(56) References Cited

U.S. PATENT DOCUMENTS

| | | | | |
|---|---|---|---|---|
| 10,528,778 | B2* | 1/2020 | Trishaun | G06K 7/10009 |
| 2007/0075142 | A1* | 4/2007 | Bellows | G06F 1/1613 |
| | | | | 235/451 |
| 2007/0222609 | A1* | 9/2007 | Duron | G06K 7/0008 |
| | | | | 340/572.7 |
| 2012/0127976 | A1* | 5/2012 | Lin | G06K 17/0022 |
| | | | | 340/10.4 |
| 2012/0196530 | A1 | 8/2012 | Moosavi et al. | |
| 2013/0311314 | A1* | 11/2013 | Fernando | G06Q 20/204 |
| | | | | 705/17 |
| 2013/0331031 | A1 | 12/2013 | Palin et al. | |
| 2014/0018128 | A1* | 1/2014 | Martin | G06K 7/1091 |
| | | | | 455/556.1 |
| 2014/0235166 | A1 | 8/2014 | Molettiere et al. | |
| 2014/0242911 | A1* | 8/2014 | Holtman | H01Q 1/243 |
| | | | | 455/41.1 |
| 2015/0024697 | A1* | 1/2015 | Holtman | H04M 1/04 |
| | | | | 455/79 |
| 2015/0126245 | A1* | 5/2015 | Barkan | G06K 7/10881 |
| | | | | 455/556.1 |
| 2017/0004475 | A1* | 1/2017 | White | G07G 1/0036 |
| 2018/0368193 | A1 | 12/2018 | Alipour et al. | |
| 2019/0180588 | A1* | 6/2019 | Lerner | G06K 7/10366 |

FOREIGN PATENT DOCUMENTS

| | | | |
|---|---|---|---|
| WO | 20130114263 | A1 | 8/2013 |
| WO | 2017004070 | A1 | 1/2017 |

OTHER PUBLICATIONS

Blue Bird Inc., "User Manual RFR900/RFR900S" pp. 1-33, Copyright 1995-2019.
Tengxiang Zhang et al: Tap-to-Pair: Associating Wireless Devices with Synchronous Tapping. Proceedings of the ACM Interactive Mob. Wearable Ubiquitous Technol. 2, 4, Article 20L retrieved on Dec. 27, 2018 (Dec. 28, 2018).
Search Report for Belgian Patent Application No. 2021/5970 daed Aug. 24, 2022.
Preliminary Search Report for French Patent Application No. 2113295 dated Aug. 31, 2022.

* cited by examiner

DEVICES, SYSTEMS AND METHODS FOR ESTABLISHING A BIDIRECTIONAL LINK BETWEEN DEVICES

BACKGROUND

In various environments, such as retail, inventory, or factory environments, users may communicatively connect a mobile computing device to a "sled" attachment RFID reader device using short-range communication protocol, such as via a Bluetooth protocol. Typically, the mobile computing device is attached on top of the sled using a mechanical adapter. The sled attachment may detect RFID tags within range and may send indications of the detected RFID tags to the mobile computing device via the short-range communication link (e.g., a Bluetooth communication link).

Currently, however, the process for pairing and connecting the mobile computing device and the sled attachment such that they can communicate with one another is cumbersome and inconvenient for users. A user must press a button (e.g., hold down a button for a certain period of time) to activate a "discoverable" mode of the sled attachment, and then open an application on the mobile computing device to discover a list of devices, select the sled attachment from the discovered list of devices to initiate pairing of the mobile computing device to the sled attachment, and press a button of the sled attachment to accept the pairing request from the mobile computing device in order to create the short-range communication link between the two devices.

This can be particularly frustrating for users who must frequently switch between devices. That is, in order to switch a given mobile computing device to communicate with a different sled attachment or switch a given sled attachment to communicate with a different mobile computing device, a user must first disconnect the initial connection and then go through the connection procedure discussed above for the two devices that are to be connected. To disconnect the initial connection, the user must either open a mobile computing device application and select the sled attachment for disconnection, or press a button of the sled attachment to disconnect.

One previous attempt to solve this problem involved mounting a near field communication (NFC) tag programmed with the sled attachment's pairing information on the sled attachment. In this prior solution, a mobile computing device equipped with an NFC reader could read the NFC tag mounted on the sled attachment and use the pairing information from the NFC tag to complete the pairing and connection. However, this prior solution requires an NFC tag to be mounted to the sled attachment, and further requires an NFC reader application of the mobile computing device to be activated at the time of connection.

Another previous attempt to solve this problem involves electrically connecting the mobile computing device and the sled attachment to initiate the communication connection. However, this prior solution can be prohibitive due to additional mechanical and electrical complexity, and can make it difficult to pair a given sled attachment with a wide variety of mobile computing device models.

SUMMARY

In an embodiment, the present invention is a method, comprising: receiving, by a mobile computing device, a short-range wireless signal from a radio-frequency identification (RFID) reader device; monitoring, by the mobile computing device, a received signal strength (RSSI) associated with the short-range wireless signal from the RFID reader device; and establishing, by the mobile computing device, a wireless communication connection to the RFID reader device based on the measured RSSI associated with the short-range wireless signal from the RFID reader device being greater than a threshold RSSI value, wherein the threshold RSSI value is calibrated based on an RSSI value associated with the short-range wireless signal from the RFID reader device measured by the mobile computing device when the mobile computing device is physically joined to RFID reader device for use as a joined device.

In another embodiment, the present invention is a system, comprising: a radio-frequency identification (RFID) reader device configured to transmit a short-range wireless signal; and a mobile computing device configured to: receive the short-range wireless signal from the RFID reader device; monitor a received signal strength (RSSI) associated with the short-range wireless signal from the RFID reader device; and establish a wireless communication connection to the RFID reader device based on the measured RSSI associated with the short-range wireless signal from the RFID reader device being greater than a threshold RSSI value, wherein the threshold RSSI value is calibrated based on an RSSI value associated with the short-range wireless signal from the RFID reader device measured by the mobile computing device when the mobile computing device is physically joined to the RFID reader device for use as a joined device.

In still another embodiment, the present invention is a mobile computing device configured to: receive a short-range wireless signal from an RFID reader device; monitor a received signal strength (RSSI) associated with the short-range wireless signal from the RFID reader device; and establish a wireless communication connection to the RFID reader device based on the measured RSSI associated with the short-range wireless signal from the RFID reader device being greater than a threshold RSSI value, wherein the threshold RSSI value is calibrated based on an RSSI value associated with the short-range wireless signal from the RFID reader device measured by the mobile computing device when the mobile computing device is physically joined to RFID reader device for use as a joined device.

In another embodiment, the present invention is a radio-frequency identification (RFID) reader device configured to: receive a short-range wireless signal from a mobile computing device; monitor a received signal strength (RSSI) associated with the short-range wireless signal from the mobile computing device; and establish a wireless communication connection to the mobile computing device based on the measured RSSI associated with the short-range wireless signal from the RFID reader device being greater than a threshold RSSI value, wherein the threshold RSSI value is calibrated based on an RSSI value associated with the short-range wireless signal from the mobile computing device measured by the RFID reader device when the RFID reader device is physically joined to the mobile computing device for use as a joined device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
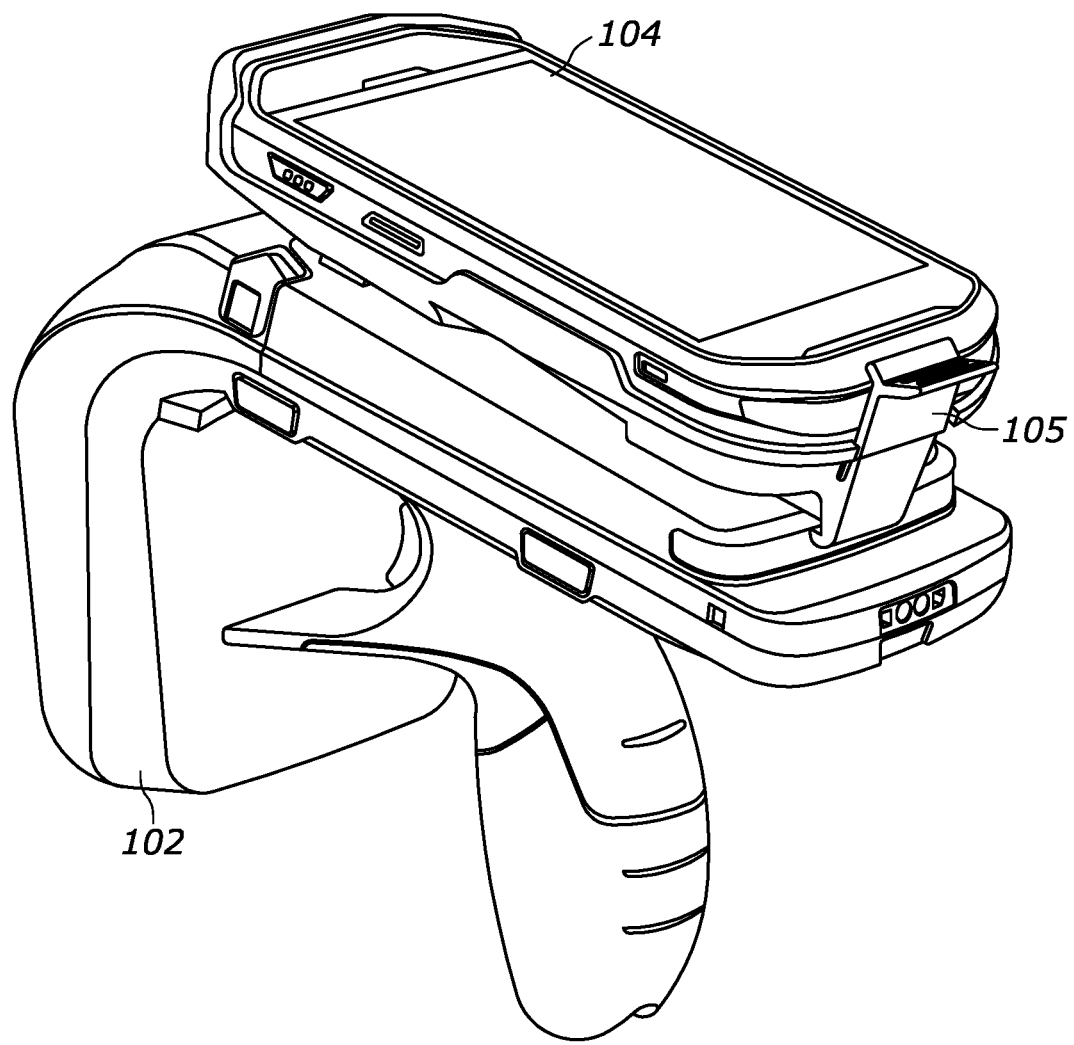
FIG. 1 illustrates an example wireless mobile computing device physically joined to an RFID reader device, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides devices, systems, and methods for establishing a bidirectional wireless communication link between two otherwise detachable devices when these devices are physically joined together for use as a physically joined device. For example, these techniques may be used to establish a bidirectional wireless communication link between a mobile computing device and a radio-frequency identification (RFID) reader (e.g., such as a "sled" attachment RFID reader), or in situations in which identifying that a mobile computing device is physically joined to another device can be used to reconfigure the operating state of either device (or both devices). For instance, when the mobile computing device is determined to be physically joined to an RFID reader device, the mobile computing device may automatically launch applications that receive and analyze RFID data. Similarly, when the mobile computing device is determined to no longer be physically joined to the RFID reader device, these applications may be closed or exited. As another example, when the mobile computing device is determined to be physically joined to an RFID reader device, the mobile computing device may be configured to use its front camera as a default camera (i.e., because the back camera may be blocked by the RFID reader device when the mobile computing device is physically joined to the RFID reader device).

FIG. 1 illustrates an example RFID reader device 102 and an example mobile computing device 104 attached via a mechanical "shim" adapter 105. The techniques provided by the present disclosure involve detecting the proximity of the mobile computing device 104 to the RFID reader 102 based on the received signal strength (RSSI) of a short-range wireless signal (e.g., a Bluetooth signal) received by the mobile computing device 104 from the RFID reader 102 and/or based on the signal strength of a short-range wireless signal received by the RFID reader 102 from the mobile computing device 104. The RFID reader 102 and/or the mobile computing device 104 may each periodically beacon a Bluetooth Low Energy (BLE) signal advertising themselves at very low power levels (e.g. −30 dBm). Both the RFID reader 102 and/or the mobile computing device 104 may listen for the other device's beacon. The beacon received by each device may be analyzed to assess the highest power received. When the received signal strength is greater than a threshold signal strength for connecting, this may be an indication that the two devices 102, 104 are physically joined together for use as a physically joined device. For instance, the threshold signal strength for connecting may be calibrated based on the signal strength of a short-range wireless signal received by the mobile computing device 104 from the RFID reader 102 when the two devices 102, 104 are physically joined together (and/or based on the signal strength of a short-range signal received by the RFID reader 102 from the mobile computing device 104 when the two devices 102, 104 are physically joined together for use as a physically joined device). In some examples, the threshold received signal strength for connecting for each of the RFID reader 102 and/or the mobile computing device 104 may be calibrated based on known power levels of signals transmitted by the other device. Moreover, in some examples, the signal itself may include an indication of the power level at which the signal is transmitted. That is, the information provided by a signal transmitted at −30 dBm may include an indication that the signal was transmitted at −30 dBm, and the threshold received signal strength for connecting may be calculated based on the indication of the signal strength provided by the signal. For instance, in some examples, if the difference between the received signal strength and the known transmission signal strength is below a threshold difference in signal strength (e.g., 3 dBm), the devices may be automatically connected. It should be understood that references to the two devices 102, 104 "physically touching," being "mechanically attached," and/or alike, may include instances where devices 102 and 104 are joined together for use as a physically joined device via, or otherwise have therebetween, an intermediate assembly, such as, for example, adapter 105, cases on one or both of the devices 102, 104, etc.

Figure 2A:
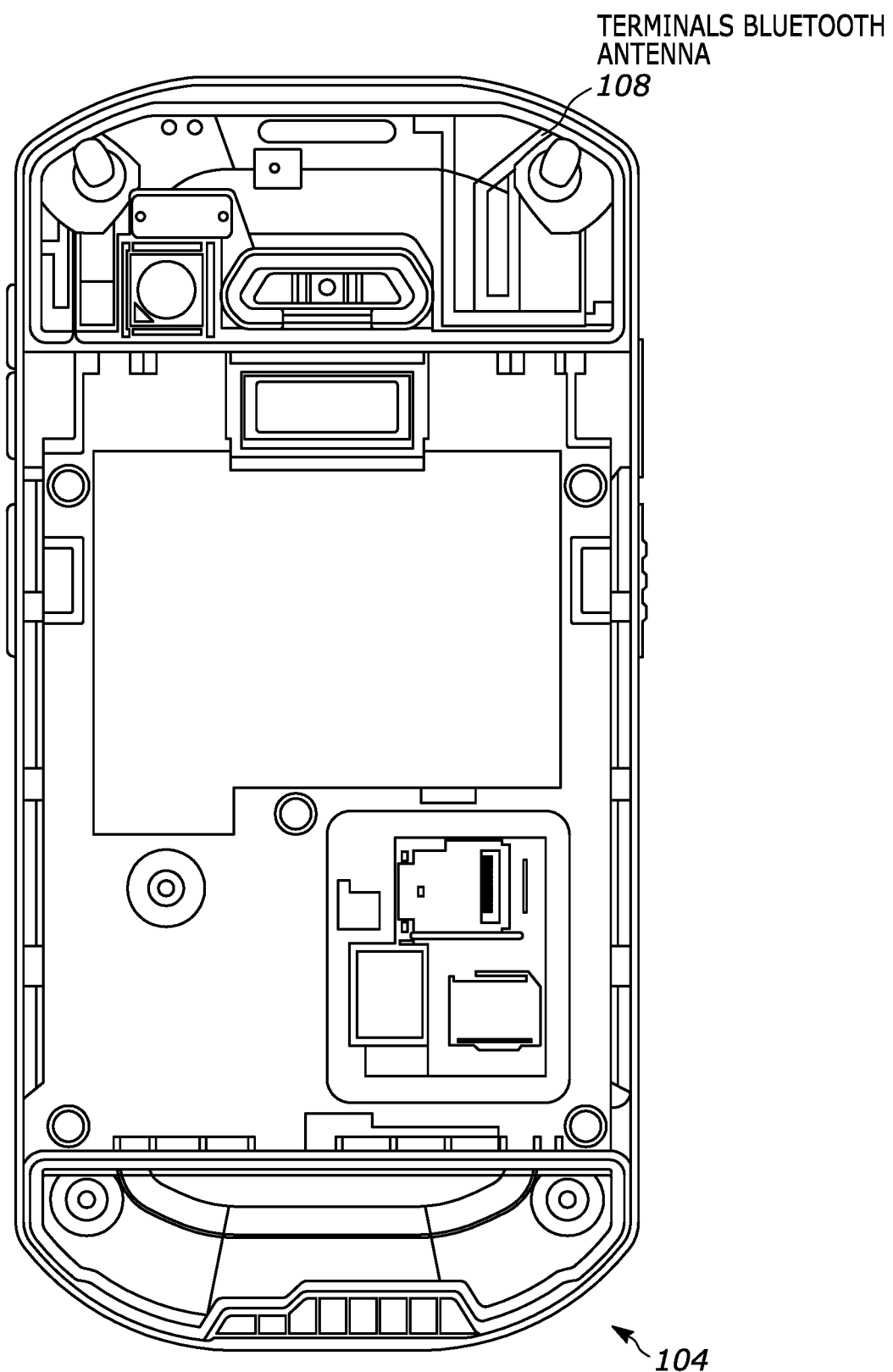
FIG. 2A illustrates an example rear view of an example wireless mobile computing device, in accordance with some examples.
Figure 2B:
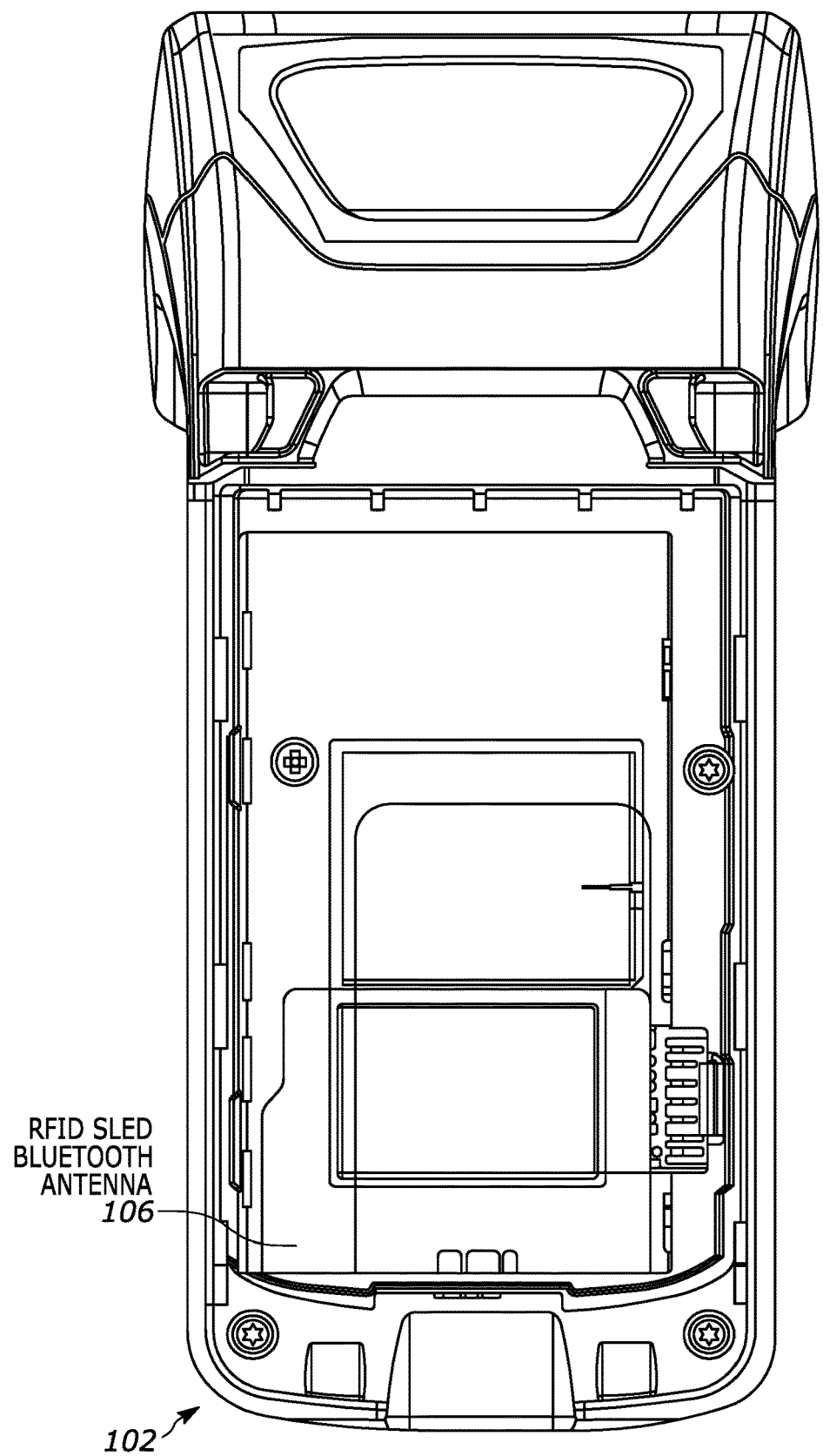
FIG. 2B illustrates an example top view of an RFID reader sled attachment in accordance with some examples.

Turning to FIG. 2, shown therein is a rear view of an example mobile computing device 104 with its rear cover removed and FIG. 2B illustrates an example top view of a RFID reader sled attachment 102 with some portions of the top cover removed. Generally speaking, each time the two devices 102, 104 are physically joined together for use as a joined device (e.g., mounted via the shim adapter 105 shown in FIG. 1), the wireless communication interfaces (e.g., Bluetooth antenna/receiver) 106, 108 of the respective devices 102, 104 will be located at a fixed distance from one another, and thus the strength of the signals sent/received via the wireless communication interfaces 106, 108 of the respective devices 102, 104 when the devices 102, 104 are physically joined together for use as a joined device should generally be the same each time as well (or within the same general range of signal strengths, e.g., within 3 dBm).

Figure 3A:
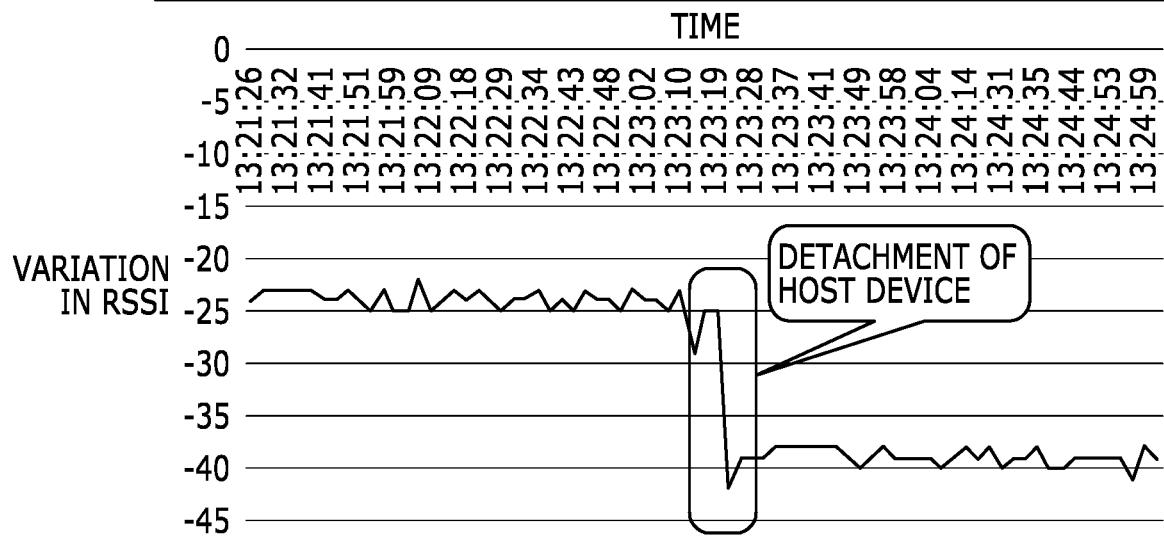
FIG. 3A illustrates an example of the variation in RSSI that occurs when a mobile computing device is detached from an RFID reader device.
Figure 3B:
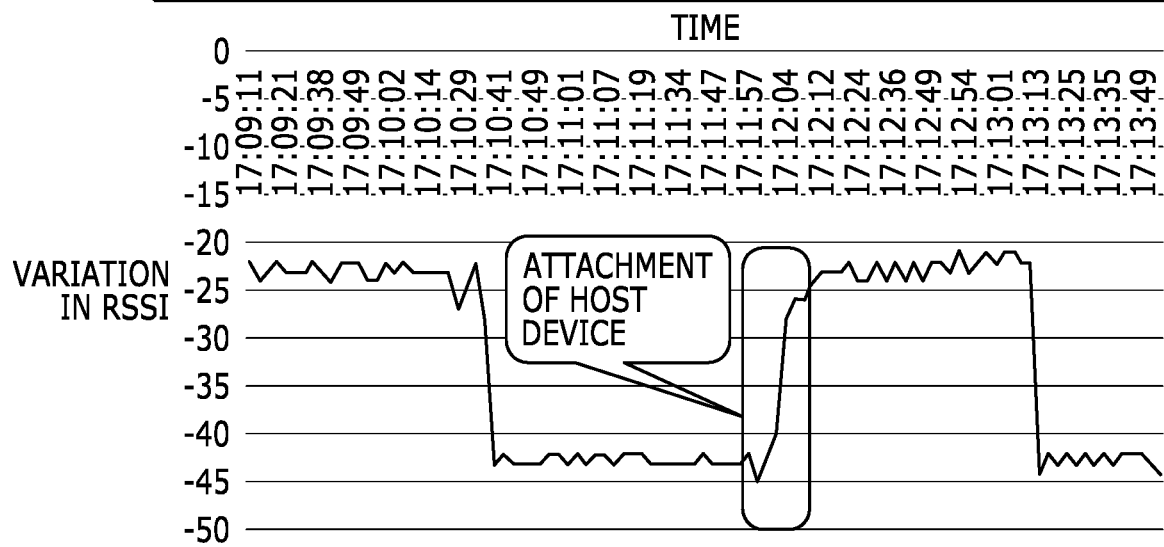
FIG. 3B illustrates an example of the variation in RSSI that occurs when a mobile computing device is physically joined to the RFID reader device.

For instance, FIG. 3A illustrates an example of the variation in RSSI that occurs when a mobile computing device 104 is detached from a RFID reader 102, and FIG. 3B illustrates an example of the variation in RSSI that occurs when the mobile computing device 104 is attached to (i.e., physically joined to) the RFID reader 102 after being detached. As shown in FIGS. 3A and 3B, there is a clear change in RSSI when the devices 102, 104 are detached from one another and re-attached. Accordingly, in some examples, an RSSI threshold value indicative of attachment (i.e., a threshold RSSI value for connecting), and an RSSI threshold value indicative of detachment (i.e., a threshold RSSI value for disconnecting), or a single RSSI threshold value above which the devices 102, 104 are likely physically joined to one another and below which the devices 102, 104 are likely detached from one another, may be calibrated for a given RFID reader 102 and mobile computing device 104 based on measuring RSSI values as these devices are physically joined together and detached from one another.

Based on the received signal strength being greater than the threshold RSSI value for connecting, the mobile computing device 104 may treat the RFID reader 102 as attached and may automatically initiate wireless pairing with the RFID reader 102. The RFID reader 102 may in turn automatically accept the pairing request and establish a wireless communication connection between the two devices 102, 104. In the pairing process, the mobile computing device 104 and the RFID reader 102 may exchange an indication of an intention to associate, which may include both the transmitting device's Bluetooth address and a varying pairing key. For example, the mobile computing device 104 may transmit its Bluetooth address and the varying pairing key in a low power beacon. The RFID reader device 102 may receive this Bluetooth address and pairing key and may in turn transmit a matching pairing key to the mobile computing device 104. Accordingly, the mobile computing device 104 can verify that the RFID reader device 102 is within close proximity of the mobile computing device 104 (i.e., because the RFID reader device 102 must have received the low power beacon signal including the pairing key in order to send the matching pairing key). Similarly, the RFID reader device 102 may transmit its Bluetooth address and a varying pairing key in a low power beacon, and the mobile computing device 104 may in turn receive the pairing key and send a matching pairing key back to the RFID reader device 102, which can verify that the mobile computing device 104 is within close proximity of the RFID reader device 102.

Moreover, when the received signal strength is below the low threshold RSSI value (i.e., indicating that the two devices 102, 104 are no longer physically joined together), the wireless communication connection between the mobile computing device 104 and RFID reader 102 may be automatically disconnected.

Advantageously, the techniques provided herein allow for a wireless communication connection to be established automatically between the mobile computing device 104 and the RFID reader 102 when the two devices 102, 104 are physically joined together for use as a physically joined device (e.g., mechanically attached via a shim adapter 105 or other mechanical adapter), without requiring user intervention or an electronic connection between the two devices 102, 104. Because the wireless communication connection is established automatically when the mobile computing device 104 and the RFID reader 102 are physically joined for use as a joined device, there is no need for a user to press buttons, open applications, or make selections in order to establish the wireless communication connection between the two devices 102, 104, advantageously reducing the amount of time a user must spend learning what must be done to establish the wireless communication connection between the two devices 102, 104 as well as the amount of time that the user must spend to actually establish the wireless communication connection between the two devices 102, 104.

Additionally, the techniques provided herein allow this wireless communication connection to be automatically disconnected when the two devices 102, 104 are no longer physically joined together, without requiring user intervention, allowing users to easily switch RFID reader devices 102 for a given mobile computing device 104 (and to easily switch mobile computing devices 104 for a given RFID reader device 102). Advantageously, because the wireless communication connection between the RFID reader 102 and the mobile computing device 104 is automatically disconnected when the received signal strength is lower than a threshold signal strength for disconnecting, the RFID reader 102 may automatically enter a low power mode as soon as disconnection occurs, rather than waiting for the wireless connection to be explicitly disconnected based on input from a user, or waiting for one of the devices 102, 104 is removed from the signal range of the other device to enter the low power mode. For instance, in some examples, the RFID reader device 102 may not detect RFID signals in the low power mode (or may detect RFID signals less frequently), in order to conserve power.

Moreover, beneficially, the techniques provided herein may be implemented using any existing RFID readers 102 and mobile computing devices 104 that support sending and/or receiving short-range communication signals (such as Bluetooth signals). Furthermore, the techniques provided herein allow for a "tap-to-pair" equivalent user experience without requiring additional NFC tags or requiring one or both devices 102, 104 to be capable of reading NFC tags. Additionally, beaconing typically happens in around 6 ms with less than 2 mA current at the lowest transmission power level. Accordingly, at a periodicity of 1 second between periodic beaconing, battery drain for the techniques provided herein is less than 1% for a typical 4800 mAh battery. Moreover, due to low power beaconing at reasonably large periodicity, the techniques provided herein generally do not cause interference with other wireless devices.

Figure 4:
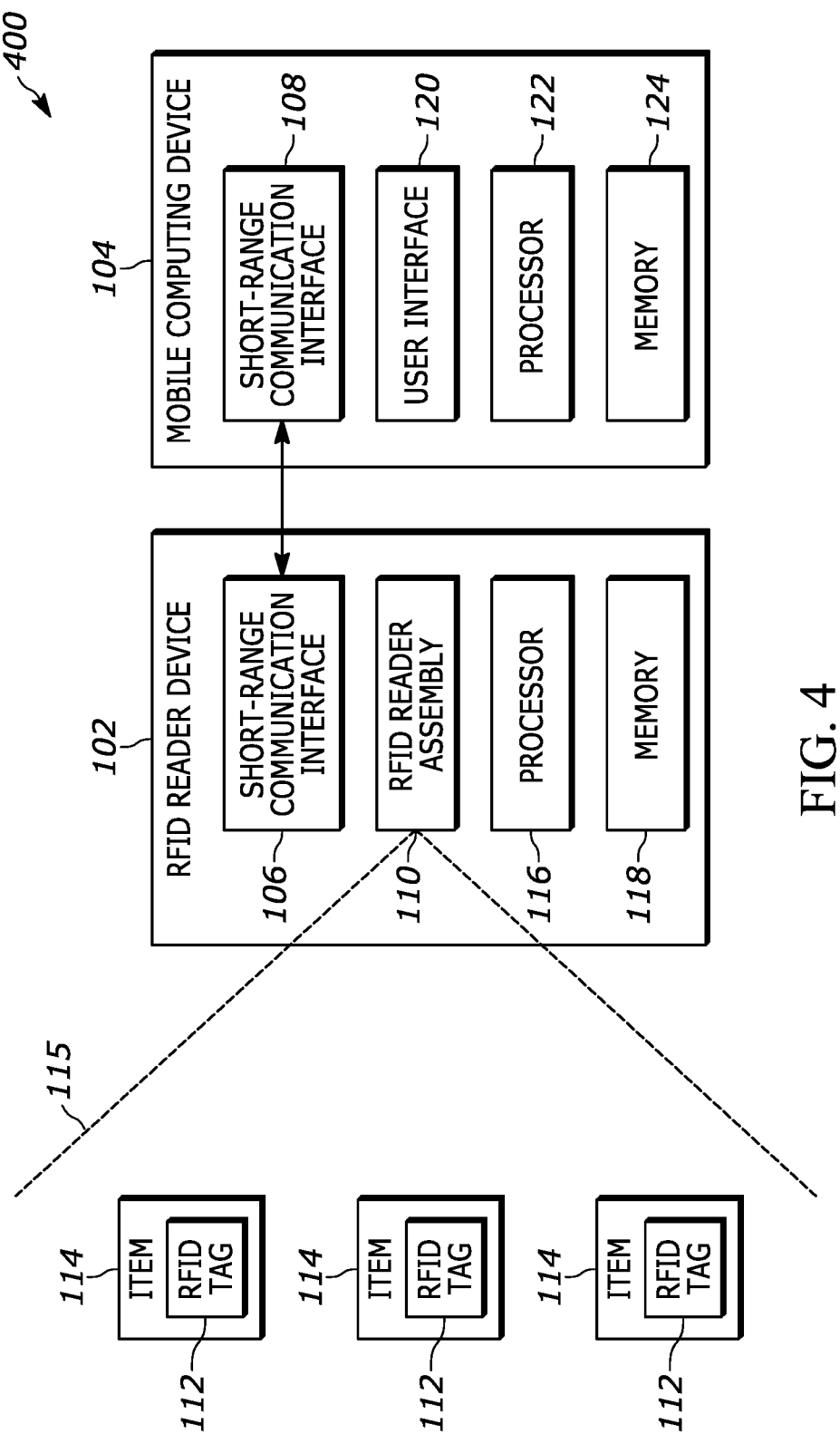
FIG. 4 illustrates a block diagram of an example system including a logic circuit for implementing the example methods and/or operations described herein, including methods for establishing a bidirectional wireless communication link between two otherwise detachable devices when these devices are physically joined together for use as a physically joined device.

FIG. 4 illustrates a block diagram of an example system 400 including a logic circuit for implementing the example methods and/or operations described herein, including methods for establishing a bidirectional wireless communication link between two otherwise detachable devices when these devices are physically joined together for use as a physically joined device. The system 400 may include an RFID reader device (e.g., an RFID reader sled attachment device as discussed above) 102, and a mobile computing device 104, configured to communicate with one another via respective short-range communication interfaces 106, 108. The short-range communication interface 106 of the RFID reader device 102 may include transmitters, receivers, transceivers, etc., and may be configured to send and/or receive short-range wireless communication signals (e.g., Bluetooth® signals, Zigbee® signals, infrared signals, etc.) to and from the short-range communication interface 108 of the mobile computing device 104, and the short-range communication interface 108 of the mobile computing device 104 may include transmitters, receivers, transceivers, etc., and may be configured to send and/or receive short-range wireless communication signals to and from the short-range communication interface 106 of the RFID reader device 102.

The RFID reader device 102 may further include an RFID reader assembly 110 configured to detect indications of RFID tags 112 attached to items 114 within a range 115, e.g., in a retail or inventor environment. Moreover, the RFID reader device 102 may include one or more processors 116 and a memory 118 (e.g., volatile memory, non-volatile memory) accessible by the one or more processors 116 (e.g., via a memory controller). The one or more processors 116 may interact with the memory 118 to obtain, for example, computer-readable instructions stored in the memory 118. The computer-readable instructions stored in the memory 118 may cause the one or more processors 116 to measure the strength of the signal received via the short-range communication interface 106 from the mobile computing device 104 and compare it to a threshold signal strength to determine whether the mobile computing device 104 is physically joined to the RFID reader device 102 for use as a joined device, and, if so, establish a wireless communication link with the mobile computing device 104 and send indications of data associated with the detected RFID tags 112 to the mobile computing device 104 via the wireless communication link. The computer-readable instructions stored in the memory 118 may further cause the one or more processors 116 to monitor the strength of the signal received via the short-range communication interface 106 from the mobile computing device 104 (e.g., periodically) and disconnect the established wireless communication link if the strength of the received signal is lower than a threshold signal strength for disconnecting (i.e., indicating that the mobile computing device 104 is no longer physically joined to the RFID reader device 102). Furthermore, the computer-readable instructions stored in the memory 118 may cause the one or more processors 116 to activate a low power mode of the RFID reader device 102 when no wireless communication link is connected. In some examples, the RFID reader device 102 may not detect RFID tags 112 while in the low power mode. Additionally, the computer-readable instructions stored on the memory 118 may include instructions for carrying out any of the steps of the method 500, described in greater detail below with respect to FIG. 5.

The mobile computing device 104 may include a user interface 120 via which the mobile computing device 104 may display information to users and/or receive input from users, e.g., regarding items 114 and/or RFID tags 112. Moreover, the mobile computing device 104 may include one or more processors 122 and a memory 124 (e.g., volatile memory, non-volatile memory) accessible by the one or more processors 122 (e.g., via a memory controller). The one or more processors 122 may interact with the memory 124 to obtain, for example, computer-readable instructions stored in the memory 124. The computer-readable instructions stored in the memory 124 may cause the one or more processors 122 to measure the strength of the signal received via the short-range communication interface 108 from the RFID reader device 102 and compare it to a threshold signal strength to determine whether the RFID reader device 102 is physically joined to the mobile computing device 104, and, if so, establish a wireless communication link with the RFID reader device 102 and receive indications of data associated with RFID tags 112 detected by the RFID reader device 102 from the RFID reader device 102 via the wireless communication link. The computer-readable instructions stored in the memory 124 may further cause the one or more processors 122 to continue to monitor the strength of the signal received via the short-range communication interface 108 from the RFID reader device 102 (e.g., periodically) and disconnect the established wireless communication link if the strength of the received signal is lower than a threshold signal strength for disconnecting (i.e., indicating that the RFID reader device 102 is no longer physically joined to the mobile computing device 104). Additionally, the computer-readable instructions stored on the memory 124 may include instructions for carrying out any of the steps of the method 500, described in greater detail below with respect to FIG. 5.

Figure 5:
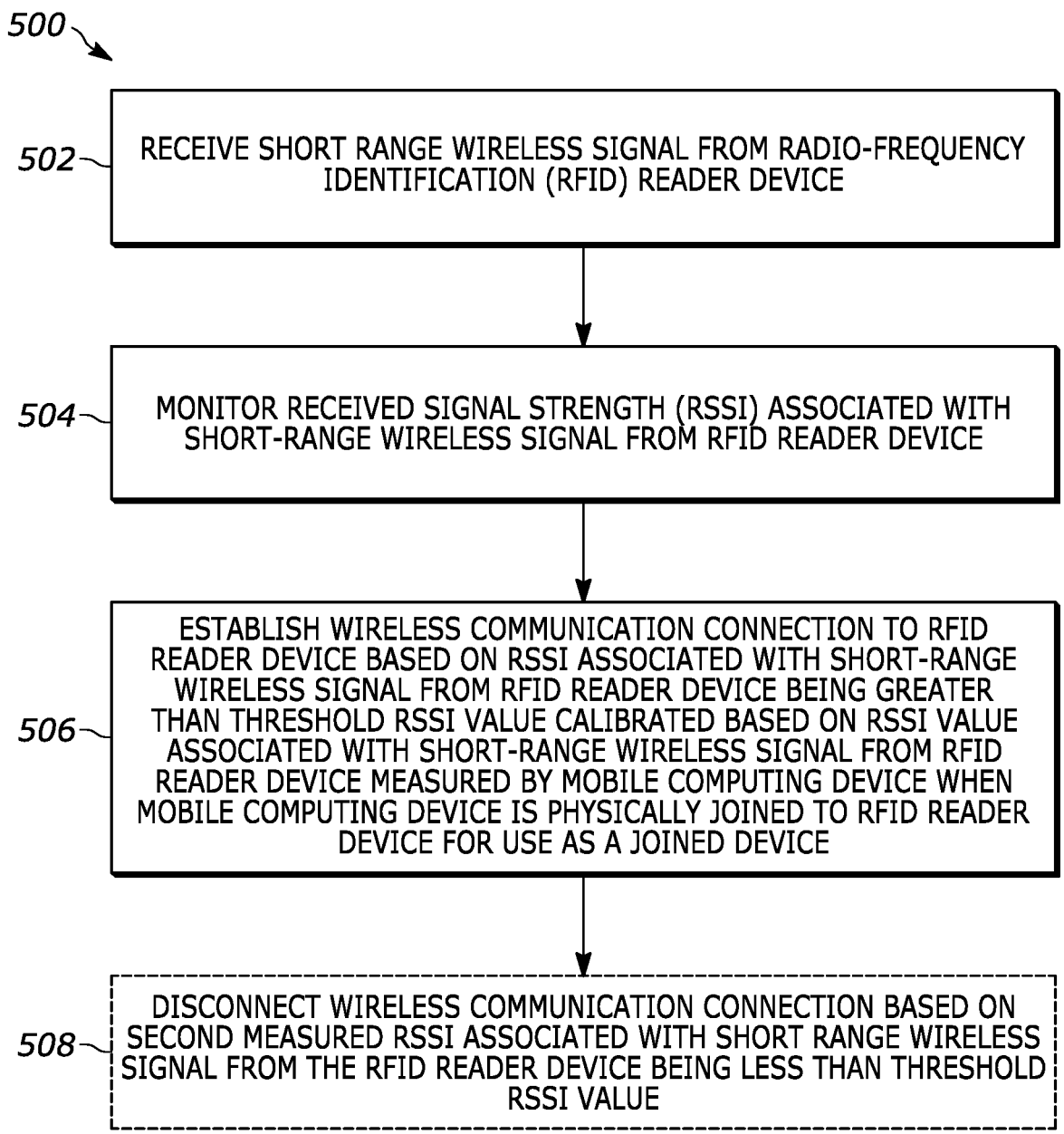
FIG. 5 illustrates a block diagram of an example process as may be implemented by the system of FIG. 4, for implementing example methods and/or operations described herein, including methods for establishing a bidirectional wireless communication link between two otherwise detachable devices when these devices are physically joined together for use as a physically joined device.

FIG. 5 illustrates a block diagram of an example process as may be implemented by the system of FIG. 4, for implementing example methods and/or operations described herein, including methods for establishing a bidirectional wireless communication link between two otherwise detachable devices when these devices are physically joined together for use as a physically joined device. One or more steps of the method 500 may be implemented as a set of instructions stored on a computer-readable memory (e.g., memory 118 of the RFID reader device 102 and/or memory 124 of the mobile computing device 104) and executable on one or more processors (e.g., processors 116 of the RFID reader device 102 and/or 122 of the mobile computing device 104).

At block 502, a short-range wireless signal may be received, e.g., by a mobile computing device, from an RFID reader device. For instance, in some examples, the short-range wireless signal may be a BLE signal. This signal may identify the Bluetooth address of the transmitting device. In some examples, the signal may also include additional device information associated with the transmitting device, such as the model of the device, or the list of services offered by the device. Additionally, in some examples, this signal may include a unique pairing key. The unique pairing key may expire after a certain period of time, and may be refreshed periodically. For instance, the signal may include a first pairing key for ten seconds (or five seconds, or one minute, or any other suitable period of time), and then the first pairing key may expire, and the signal may include a second pairing key for ten seconds, which may then expire, and so on. Additionally, in some examples, the signal may include an indication of the transmission strength of the signal.

At block 504, the RSSI associated with the short-range wireless signal is monitored, e.g., by the mobile computing device.

At block 506, a wireless communication connection to the RFID reader device is established, e.g., by the mobile computing device, based on the measured RSSI associated with the short-range wireless signal from the RFID reader device being greater than a threshold RSSI value. The threshold RSSI value may be calibrated based on an RSSI value associated with the short-range wireless signal from the RFID reader device measured by the mobile computing device when the mobile computing device is mechanically attached to, physically touching, or otherwise within sufficient proximity to the RFID reader device, e.g., as discussed above with respect to FIGS. 3A and 3B. For instance, calibration may be part of the factory settings for the devices, or may be done in the field. In some examples, received signal strengths may be measured for a variety of different models of mobile computing devices at times when the mobile computing devices are each physically joined to the RFID reader device, and at times when the mobile computing devices are detached from the RFID reader device. The measured received signal strengths may be used to calculate threshold received signal strengths for connecting and disconnecting to the RFID reader device, for each model of mobile computing device.

Moreover, in some examples, the threshold RSSI value is further calibrated based on a known transmission power level (e.g., −30 dBm) of the short-range wireless signal from the RFID reader device. In some examples, the signal itself may include an indication of the signal's transmission power, while in some examples, the signal's transmission power may be determined based on the model of the RFID reader device. That is, the information provided by a signal transmitted at −30 dBm may include an indication that the signal was transmitted at −30 dBm, and the threshold received signal strength for connecting may be calculated based on the indication of the signal strength provided by the signal. In some examples, if the difference between the received signal strength and the known transmission signal strength is below a threshold difference in signal strength (e.g., a 3 dBm difference), the devices may be automatically connected.

Specifically, establishing the wireless communication connection to the RFID reader device may be done automatically upon detecting a signal strength greater than the threshold RSSI value (and, in some examples, receiving the correct pairing key), without requiring input from a user of the mobile computing device and/or without requiring input from a user of the RFID reader device. Moreover, in some examples, RFID data captured by the RFID reader device may be received, e.g., by the mobile computing device, via the wireless communication connection to the RFID reader device. The RFID data may include indications of RFID tags associated with items in a retail or inventory environment.

At block 508, optionally, the wireless communication connection may be disconnected based on the measured received signal strength associated with the short-range wireless signal from the RFID reader device being less than the threshold received signal strength value, e.g., at a second time after the time at which the short-range wireless signal from the RFID reader device was greater than the threshold received signal strength value. Specifically, disconnecting the wireless communication connection to the RFID reader device may be done automatically, without requiring input from a user of the mobile computing device and/or without requiring input from a user of the RFID reader device.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method, comprising:

receiving, by a mobile computing device, a short-range wireless signal from a radio-frequency identification (RFID) reader device, the RFID reader device being a sled attachment RFID reader device;

monitoring, by the mobile computing device, a received signal strength (RSSI) associated with the short-range wireless signal from the RFID reader device to obtain a measured RSSI; and establishing, by the mobile computing device, a wireless communication connection to the RFID reader device based on the measured RSSI associated with the short-range wireless signal from the RFID reader device being greater than a threshold RSSI value, wherein the threshold RSSI value is calibrated based on an RSSI value associated with the short-range wireless signal from the RFID reader device measured by the mobile computing device when the mobile computing device is physically joined, via a mechanical arrangement, to the RFID reader device for use as a joined device.

2. The method of claim 1, wherein the measured RSSI is a first measured RSSI measured at a first time, the method further comprising:

disconnecting, by the mobile computing device, the wireless communication connection based on a second measured RSSI associated with the short-range wireless signal from the RFID reader device being less than the threshold RSSI value at a second time after the first time.

3. The method of claim 2, wherein disconnecting the wireless communication connection from the RFID reader device is done without requiring input from a user of the mobile computing device.

4. The method of claim 1, wherein establishing the wireless communication connection to the RFID reader device is done without requiring input from a user of the mobile computing device.

5. The method of claim 1, wherein the threshold RSSI value is −30 dBm.

6. The method of claim 1, wherein the threshold RSSI value is further calibrated based on a transmission power level of the short-range wireless signal from the RFID reader device.

7. The method of claim 6, wherein the short-range wireless signal includes an indication of the transmission power level of the short-range signal from the RFID reader device.

8. The method of claim 1, wherein the short-range wireless signal is a Bluetooth Low Energy signal.

9. The method of claim 1, further comprising:

receiving, by the mobile computing device, RFID data captured by the RFID reader device via the wireless communication connection to the RFID reader device, the RFID data including indications of RFID tags associated with items.

10. The method of claim 1, further comprising sending, by the mobile computing device, to the RFID reader device, a second short-range wireless signal including a pairing key.

11. The method of claim 10, wherein the short-range wireless signal from the RFID reader device further includes a matching pairing key that matches the pairing key sent by the mobile computing device, and wherein establishing the wireless connection to the RFID reader device is further based on the short-range wireless signal from the RFID reader device including the matching pairing key.

12. The method of claim 10, wherein the pairing key expires after a particular duration of time, and further comprising sending, by the mobile computing device, to the RFID reader device, a third short-range wireless signal including a new pairing key after the particular duration of time.

13. A system, comprising:
a radio-frequency identification (RFID) reader device configured to transmit a short-range wireless signal, the RFID reader device being a sled attachment RFID reader device; and
a mobile computing device configured to:
receive the short-range wireless signal from the RFID reader device;
monitor a received signal strength (RSSI) associated with the short-range wireless signal from the RFID reader device to obtain a measured RSSI; and
establish a wireless communication connection to the RFID reader device based on the measured RSSI associated with the short-range wireless signal from the RFID reader device being greater than a threshold RSSI value, wherein the threshold RSSI value is calibrated based on an RSSI value associated with the short-range wireless signal from the RFID reader device measured by the mobile computing device when the mobile computing device is physically joined, via a mechanical arrangement, to the RFID reader device for use as a joined device.

14. The system of claim 13, wherein the short-range wireless signal is transmitted by the RFID reader device using a transmission power of −30 dBm.

15. The system of claim 13, wherein the short-range wireless signal is transmitted by the RFID reader device using a transmission power of −20 dBm to −40 dBm.

16. The system of claim 13, wherein the measured RSSI is a first measured RSSI measured at a first time, and wherein the mobile computing device is further configured to disconnect the wireless communication connection based on a second measured RSSI associated with the short-range wireless signal from the RFID reader device being less than the threshold RSSI value at a second time after the first time.

17. The system of claim 16, wherein the RFID reader device is further configured to switch from a first mode, in which the RFID reader device operates at a first power level, and a second mode, in which the RFID reader device operates at a second power level, the second power level being a lower power level than the first power level, when the wireless communication connection is disconnected.

18. The system of claim 16, wherein the mobile computing device is configured to disconnect the wireless communication connection to the RFID reader device without requiring input from a user of the mobile computing device.

19. The system of claim 13, wherein the mobile computing device is configured to establish the wireless communication connection to the RFID reader device without requiring input from a user of the mobile computing device.

20. The system of claim 13, wherein the threshold RSSI value is −30 dBm.

21. The system of claim 13, wherein the threshold RSSI value is further calibrated based on a transmission power level with which the RFID reader device transmits the short-range wireless signal from the RFID reader device.

22. The system of claim 21, wherein the short-range wireless signal from the RFID reader device includes an indication of the transmission power level of the short-range signal from the RFID reader device.

23. The system of claim 13, wherein the short-range wireless signal is a Bluetooth Low Energy signal.

24. The system of claim 13, wherein the RFID reader device is further configured to capture RFID data, the RFID data including indications of RFID tags associated with items, and transmit the captured RFID data to the mobile computing device via the wireless communication connection.

25. The system of claim 13, wherein the mobile computing device is further configured to receive RFID data, the RFID data including indications of RFID tags associated with items, captured by the RFID reader via the wireless communication connection.

26. The system of claim 13, wherein the mobile computing device is further configured to send, to the RFID reader device, a second short-range wireless signal including a pairing key.

27. The system of claim 26, wherein the short-range wireless signal from the RFID reader device further includes a matching pairing key that matches the pairing key sent by the mobile computing device and wherein establishing the wireless connection to the RFID reader device is further based on the short-range wireless signal from the RFID reader device including the matching pairing key.

28. The system of claim 26, wherein the pairing key expires after a particular duration of time, and wherein the mobile computing device is further configured to send, to the RFID reader device, a third short-range wireless signal including a new pairing key after the particular duration of time.

* * * * *